United States Patent
Braun et al.

(10) Patent No.: US 11,873,036 B2
(45) Date of Patent: Jan. 16, 2024

(54) HELICAL GEAR TRANSMISSION COMPRISING A PIVOT BEARING WITH A DEFINED PIVOT AXIS

(71) Applicants: thyssenkrupp Presta AG, Eschen (LI); thyssenkrupp AG, Essen (DE)

(72) Inventors: Johannes Braun, Dornbirn (AT); Deniz Ilhan, Rüthi (CH); Hans-Peter Studer, Bludesch (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 793 days.

(21) Appl. No.: 16/971,384

(22) PCT Filed: Mar. 5, 2019

(86) PCT No.: PCT/EP2019/055366
§ 371 (c)(1),
(2) Date: Aug. 20, 2020

(87) PCT Pub. No.: WO2019/174961
PCT Pub. Date: Sep. 19, 2019

(65) Prior Publication Data
US 2021/0086820 A1 Mar. 25, 2021

(30) Foreign Application Priority Data
Mar. 15, 2018 (DE) .................. 10 2018 106 026.2

(51) Int. Cl.
*B62D 5/04* (2006.01)
*F16C 19/06* (2006.01)
(Continued)

(52) U.S. Cl.
CPC .......... *B62D 5/0409* (2013.01); *B62D 5/0454* (2013.01); *F16C 19/06* (2013.01);
(Continued)

(58) Field of Classification Search
CPC .......................... B62D 5/0454; B62D 5/0409
See application file for complete search history.

(56) References Cited

U.S. PATENT DOCUMENTS

2016/0025209 A1   1/2016   Anma et al.
2016/0031473 A1   2/2016   Riepold
(Continued)

FOREIGN PATENT DOCUMENTS

CN   105276089 A    1/2016
CN   206813091 U   12/2017
(Continued)

OTHER PUBLICATIONS

English Translation of International Search Report issued in PCT/EP2019/055366, dated May 22, 2019.

*Primary Examiner* — Kevin Hurley
(74) *Attorney, Agent, or Firm* — thyssenkrupp North America, LLC

(57) ABSTRACT

A helical gear transmission for an electromechanical servo steering mechanism may include a shaft that meshes with a helical gear. The shaft may be arranged in a transmission housing and, at its first end, may be mounted in a drive-side bearing arrangement so as to be rotatable about an axis of rotation. At its second end, the shaft may be mounted in a drive-remote bearing arrangement in the transmission housing. The drive-side bearing arrangement may have a rolling bearing, an outer ring of which is spherical. The rolling bearing may be enclosed by two bearing shells. The outer side of the outer ring may have two flat points that are opposite one another and form a pivot axis about which the shaft is pivotable in a direction of the helical gear.

16 Claims, 3 Drawing Sheets

(51) Int. Cl.
*F16C 35/077* (2006.01)
*F16H 55/24* (2006.01)
*F16H 57/021* (2012.01)

(52) U.S. Cl.
CPC ........ *F16C 35/077* (2013.01); *F16C 2380/27* (2013.01); *F16H 55/24* (2013.01); *F16H 2057/0213* (2013.01)

(56) References Cited

U.S. PATENT DOCUMENTS

| | | |
|---|---|---|
| 2018/0003290 A1 | 1/2018 | Figura et al. |
| 2018/0058556 A1 | 3/2018 | Appleyard |
| 2019/0308658 A1 | 10/2019 | Brassel |
| 2022/0099159 A1* | 3/2022 | Oosawa .................. F16C 19/06 |

FOREIGN PATENT DOCUMENTS

| | | | | |
|---|---|---|---|---|
| CN | 107531273 A | 1/2018 | | |
| CN | 107542856 A | 1/2018 | | |
| DE | 10 2008 054 441 A | 6/2010 | | |
| DE | 10 2009 018 674 A | 10/2010 | | |
| DE | 10 2009 002 940 A | 11/2010 | | |
| DE | 10 2013 003 749 A | 9/2014 | | |
| DE | 20 2016 103 799 U | 7/2016 | | |
| DE | 10 2016 012 246 A1 | 4/2018 | | |
| EP | 3401571 A1 * | 11/2018 | ............ | F16C 33/581 |
| JP | H09-88940 A | 3/1997 | | |
| JP | 2021017930 A * | 2/2021 | ........... | B62D 5/0409 |
| WO | WO-2021241135 A1 * | 12/2021 | | |

\* cited by examiner

HELICAL GEAR TRANSMISSION COMPRISING A PIVOT BEARING WITH A DEFINED PIVOT AXIS

CROSS REFERENCE TO RELATED APPLICATIONS

This application is a U.S. National Stage Entry of International Patent Application Serial Number PCT/EP2019/055366, filed Mar. 5, 2019, which claims priority to German Patent Application No. DE 10 2018 106 026.2, filed Mar. 15, 2018, the entire contents of both of which are incorporated herein by reference.

FIELD

The present disclosure generally relates to helical gear transmissions for electromechanical servo steering mechanisms.

BACKGROUND

In electromechanical servo steering mechanisms, an electric motor generates a torque which is transmitted to a transmission and is superimposed there on the steering torque set by the driver.

An electromechanical servo steering mechanism of the type in question has an electric servo motor which drives a worm shaft which meshes with a worm gear arranged on a steering shaft or directly on a steering pinion, wherein the worm shaft is mounted rotatably in a transmission housing. The worm shaft is connected here to the motor shaft of the electric servo motor via a clutch.

A conventional worm transmission has a fixed bearing at the drive-side end and a movable bearing at the free end. Inaccuracies, wear effects, soiling and the like caused by the manufacturing or installation lead individually or in combination to the engagement between worm shaft and worm gear being too loose and/or too tight. Too tight an engagement leads to increased friction, and therefore the transmission becomes stiff and the wear is increased. It is therefore an aim to permit an optimum engagement between worm shaft and worm gear such that the worm transmission, in combination with low friction, runs quietly without rattling or knocking.

It is known in the prior art to mount the worm shaft at a drive-side end via a first rolling bearing which permits a certain tilting movement or pivoting movement transversely with respect to the axial direction, while the worm shaft is mounted rotatably at the opposite end in a second rolling bearing which is connected to a transmission housing or the like via a spring element acting upon it in the direction of the worm gear. Depending on requirements, the worm shaft can therefore pivot about the first rolling bearing in order to ensure an approximately constant engagement with the worm gear.

Laid-open application DE 10 2013 003 749 A1 discloses a bearing arrangement for a transmission of a servo steering mechanism. The worm shaft is mounted at the motor-side end via a bearing arrangement and at the opposite end by means of a loose ball bearing. Force is applied here to the loose ball bearing by a spring element in such a manner that the worm shaft is pretensioned against the worm gear. The fixed bearing comprises a ball bearing which is surrounded in the radial direction by a casing element which has a certain radial deformability and has a convex profile in cross section radially on the inner or outer side. The ball bearing is supported on the transmission housing via said casing element and optionally via an elastic element arranged in between, as a result of which the worm shaft together with the ball bearing can be tilted about a pivot axis passing centrally through the fixed bearing. For the axial fastening of the bearing, axial spring elements composed of elastomers arranged between two rings are provided on both sides of the fixed bearing.

Thus a need exists for a helical gear transmission which has a bearing arrangement which, while requiring a reduced amount of construction space, produces an improved engagement between worm shaft and worm gear, with a reduction in noise.

DETAILED DESCRIPTION

Figure 1:
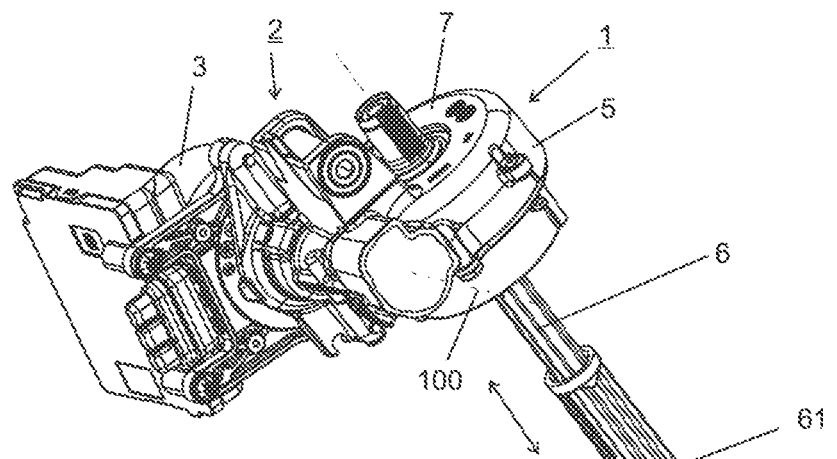
FIG. 1 is a perspective view of an example worm transmission of an electromechanical servo steering mechanism.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a helical gear transmission for an electromechanical servo steering mechanism is provided, comprising a shaft which meshes with a helical gear, wherein the shaft is arranged in a transmission housing and, at its first end, is mounted in a first bearing arrangement so as to be rotatable about an axis of rotation and, at its second end, is mounted in a second bearing arrangement in the transmission housing, wherein the first bearing arrangement has a rolling bearing, the outer ring of which is shaped spherically, and wherein the rolling bearing is enclosed by two bearing shells, wherein the outer side of the outer ring of the rolling bearing has two flat points which lie opposite each other in the circumferential direction and form a pivot axis about which the shaft is pivotable in the direction of the helical gear. The flat points are preferably circular. Furthermore preferably, the circle diameter of the flat points is smaller than the width of the outer ring. Preferably, the first bearing arrangement is the drive-side bearing arrangement and the second bearing arrangement is the drive-remote bearing arrangement.

By means of a simple modification of the bearing outer ring, the bearing arrangement according to the invention has a pivot bearing with which the engagement of the helical gear transmission can be improved in a manner saving on construction space.

An inner side of the bearing shells preferably has two flat surfaces which lie opposite each other in the circumferential direction and are in contact with the flat points of the outer ring in order to define the pivot axis. Preferably, the flat surfaces are in the shape of squares or in the shape of rectangles.

Particularly preferably, the length of the flat surfaces with respect to the circumferential direction of the bearing shells is equal to or greater than the diameter of the flat points of the outer ring.

It is furthermore preferred if the outer ring of the rolling bearing is in contact with the inner side of the bearing shells in two further limited contact surfaces. The contact surfaces are preferably arranged lying opposite one another in the circumferential direction. It is furthermore conceivable and possible for a plurality of contact surfaces, which can be arranged lying opposite one another, to be provided on the inner circumference of the bearing shells on both sides at regular intervals between the flat surfaces. Overall, between two and sixteen contact surfaces can be provided. The contact surfaces are particularly preferably inclined toward the rolling bearing center point. The contact surfaces are preferably shaped in a diametrically opposed manner to the spherical outer side of the outer ring and thus permit radial positioning of the rolling bearing. In a diametrically opposed manner should be understood here as meaning that the contact surfaces are formed in an identical, but mirror-inverted, manner and on both sides with respect to the spherical outer side of the outer ring.

The contact surfaces are preferably arranged offset by 90° in the circumferential direction with respect to the flat surfaces. Preferably, the bearing shells are of a substantially circular-cylindrical shape and concentrically surround the rolling bearing in the unloaded state. The inside diameter of the bearing shells is particularly preferably greater in the regions outside the contact surfaces and the flat surfaces than the outside diameter of the outer ring of the rolling bearing. Preferably, the inner surface of the bearing shells can assume a polygonal, star-shaped and, particularly preferably, a cloverleaf-shaped contour.

In an advantageous embodiment, the outer ring of the rolling bearing is in contact with the inner side of a bearing shell at exclusively four positions, in particular at the contact surfaces and the flat surfaces.

It can furthermore be provided that the bearing shells have lateral elevations which define the position of the rolling bearing in the direction of the axis of rotation and can therefore absorb axial forces. The lateral elevations are preferably two surfaces which lie opposite each other in the circumferential direction and protrude inward with respect to the axis of rotation. Particularly preferably, the lateral elevations can extend in the circumferential direction over an angular range which is greater than that of the flat surfaces.

Preferably, the lateral elevations are located along the circumference at least partially in a region of the flat surfaces. The lateral elevations extend here over an angular range of 10° to 60° and opposite in an angular range of 300° to 350°. Particularly preferably, the lateral elevations extend in an angular range of 45° to 135° and, opposite thereto, in an angular range of 225° to 315°.

It is advantageous if the lateral elevations are each arranged on an end side of the bearing shell and, on their inner side, are in contact with in each case an end side of the outer ring of the rolling bearing. It is thus ensured that the tilting movement of the bearing is not impaired.

The bearing shells are preferably formed identically. The bearing shells are preferably manufactured from a metal material and particularly preferably from a plastic or rubber.

Furthermore, it is preferably provided that the outer side of the bearing shells has projections as a means for securing against rotation, said projections engaging in corresponding recesses of the transmission housing. Said projections define the orientation of the bearing in the housing and therefore ensure precise positioning.

It can furthermore be provided that the second bearing arrangement has a prestressing device, by means of which the position of the shaft is adjustable with respect to the helical gear.

In a preferred embodiment, the helical gear is a worm gear and the shaft is a worm shaft.

Furthermore, an electromechanical servo steering mechanism is provided, comprising an electric motor with a motor shaft which has a previously described helical gear transmission, wherein the motor shaft drives the shaft of the helical gear transmission. The helical gear is preferably arranged for conjoint rotation on a steering shaft of a motor vehicle.

FIG. 1 shows a power-assisted steering mechanism 1 which is attached to a steering shaft 6 which is mounted rotatably about its longitudinal axis L, the steering shaft axis. The steering shaft 6 is rotationally fixed in a rear steering shaft part 61, but is adjustable in the direction of the longitudinal axis L, as indicated by the double arrow, in order to adjust a steering wheel (not illustrated here), which is attached to a fastening portion 62, in the longitudinal direction.

Figure 2:
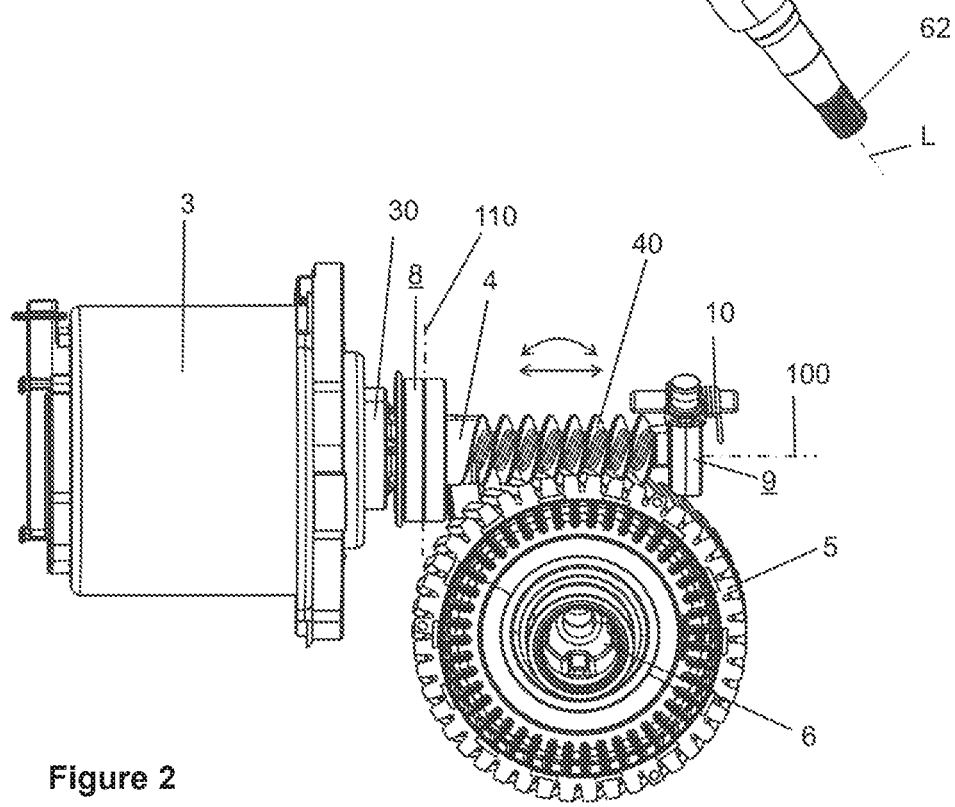
FIG. 2 is a detailed view of the example worm transmission of FIG. 1 reduced to an electric motor and a worm shaft in engagement with a worm gear.

The power-assisted steering mechanism has a transmission housing 7 which has been omitted in the exploded illustration of FIG. 2. In the transmission housing 7, a worm gear 5, which is connected to the steering shaft 6 for conjoint rotation, is mounted rotatably about the longitudinal axis L. A worm shaft 4 is in toothing engagement with the worm gear 5 in order to form a worm transmission.

An electric motor or a servo motor 3 drives the worm shaft 4 via a motor shaft which is coupled for conjoint rotation to the worm shaft 4 via a clutch 30 consisting of two clutch parts. The worm shaft 4 is in engagement by means of its worm 40 with a worm gear 5, which is connected for conjoint rotation to a pinion or, as illustrated here, to the lower steering shaft 6. During operation of the electric motor 3, the worm shaft 4 is driven and the worm gear 5 correspondingly rotates in order to provide rotational assistance for the lower steering shaft 6.

Figure 3:
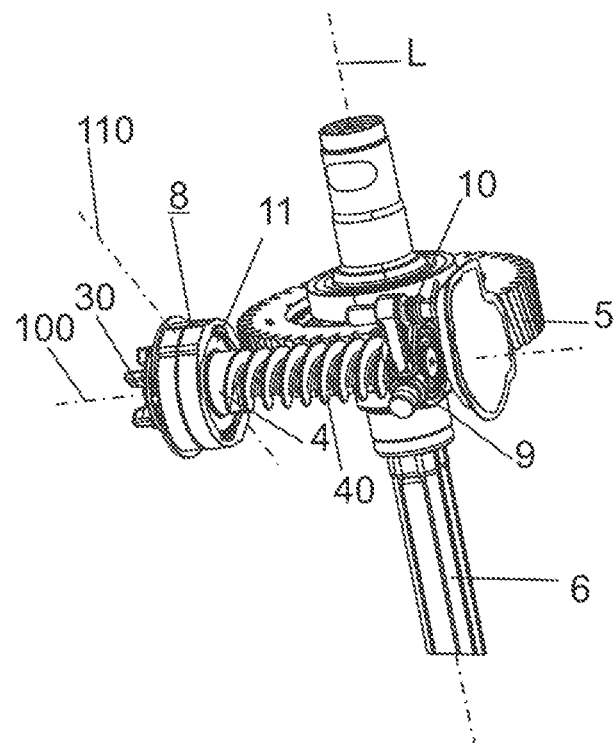
FIG. 3 is a perspective view of an example engagement of worm shaft and worm gear.
Figure 4:
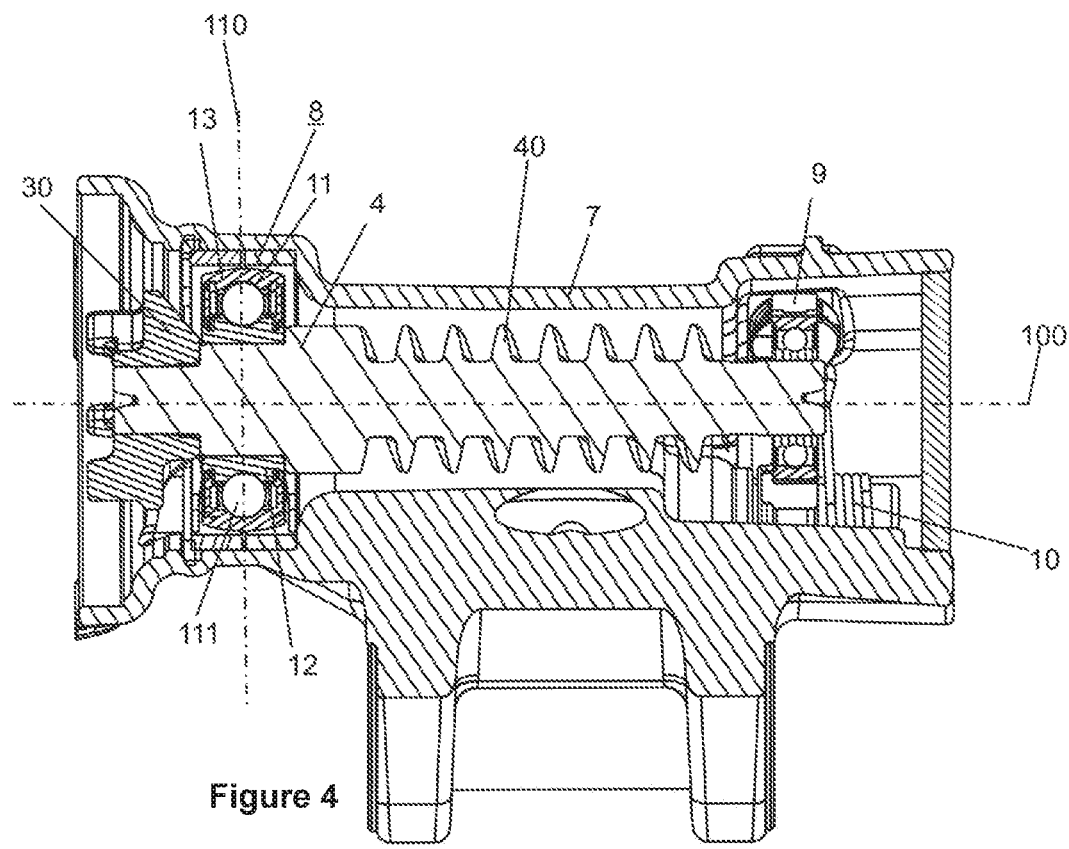
FIG. 4 is a longitudinal sectional view through a worm shaft with a bearing arrangement.

FIGS. 2 to 4 show the worm shaft 4 with a drive-side bearing arrangement 8 and a drive-remote bearing arrangement 9 and the worm gear 5 meshing with the worm shaft 4.

The worm shaft 4 meshes with the worm gear 5 via the worm toothing 40. The worm gear 5 is in turn connected for conjoint rotation to the steering shaft 6, which runs between a steering wheel (not illustrated) and the actual steering gear of the motor vehicle. The constructional elements mentioned are mounted in the common transmission housing 7.

The worm shaft 4 is mounted here in the transmission housing 7 by means of the drive-side bearing arrangement 8 and the drive-remote bearing arrangement 9 so as to be rotatable about a longitudinal axis 100. The drive-remote bearing arrangement 9 is a rolling bearing which is in the form of a movable bearing. The position of the worm shaft 4 is adjustable with respect to the worm gear 5 by means of a pretensioning device 10 in the region of the drive-remote bearing arrangement 9. The drive-side bearing arrangement 8 has a rolling bearing 11 which permits pivoting movements about a pivot axis 110, which is oriented perpendicularly to the longitudinal axis 100, in the transmission housing 7.

Figure 5:
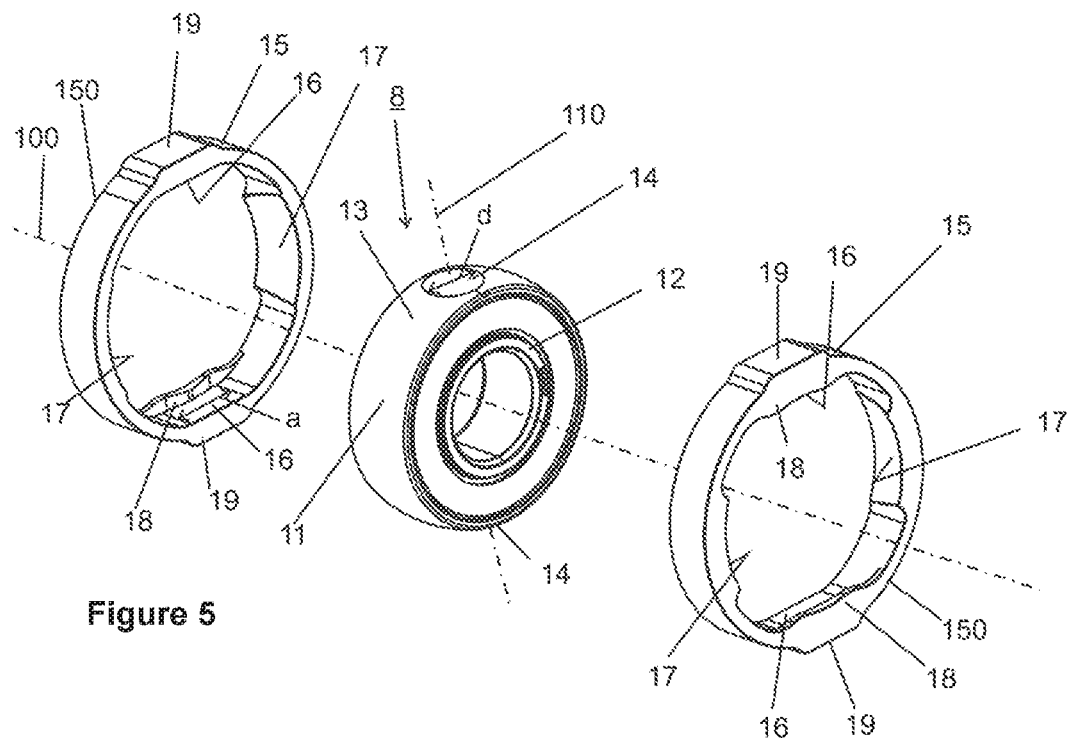
FIG. 5 is an exploded view of an example bearing arrangement.
Figure 6:
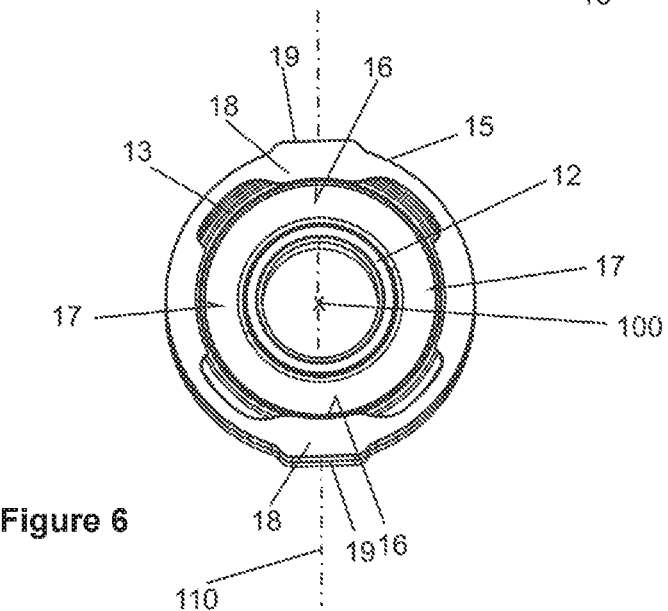
FIG. 6 is a side view of an example bearing arrangement.

The drive-side bearing arrangement 8 is illustrated in detail in FIGS. 5 and 6. As illustrated in FIG. 4, the drive-side bearing arrangement 8 has a rolling bearing 11 with an inner ring 12, rolling bodies 111 and an outer ring 13. The rolling bodies 111 run in grooves between the inner ring 12 and the outer ring 13. The inner ring 12 has an inner cylindrical casing surface for a firm seat on the worm shaft. The outer ring 13, as illustrated in FIG. 5, is formed spherically on the outer side and, on the outer side, has two flat points 14 lying opposite each other in the circumferential direction of the outer ring. The two flat points 14 are flat surfaces which are preferably circular and the circle diameter of which is smaller than the width of the outer ring 13. The flat points 14 are arranged centrally on the outer side of the outer ring 13 in the direction of the longitudinal axis 100 and define the pivot axis 110, about which the drive-side bearing arrangement 8 can be tilted. The rolling bearing 11 is surrounded in the direction of the longitudinal axis 100 by two bearing shells 15 which are of substantially circular-cylindrical shape and concentrically surround the rolling bearing 11 in the unloaded state. The bearing shells 15 are half shells which are preferably formed identically. The inner side of the bearing shells 15 has two flat surfaces 16 which are in the shape of squares or are in the shape of rectangles and are matched to the flat points 14 of the outer ring 13 and against which the outer ring 13 lies. The length a of the flat surface 16 is greater with respect to the circumferential direction of the bearing shells 15 than the diameter d of the flat points 14 of the outer ring 13. The flat points 14 and the flat inner surfaces 16 are formed so as to define the pivot axis 110 perpendicularly thereto.

The bearing shells 15 furthermore lie against the outer ring 13 of the rolling bearing 11 within two contact surfaces 17 that are limited in the circumferential direction. These contact surfaces 17 are arranged offset by 90° with respect to the flat surfaces 16. The contact surfaces 17 lie opposite each other in the circumferential direction. The contact surfaces 17 are shaped in a diametrically opposed manner to the spherical outer side of the outer ring 13 and are inclined toward the rolling bearing center point. They extend, for example, along the inner circumference over an angular range of between 20° and 60°. The contact surfaces 17 permit radial positioning of the bearing 11 and of the longitudinal axis 100 thereof.

The inside diameter of the bearing shells 15 is greater in the regions outside the contact surfaces 17 and the flat surfaces 16 than the outside diameter of the outer ring 13 of the rolling bearing 11. The bearing 11 is therefore in contact with the bearing shells 15 exclusively at the contact surfaces 17 and the flat surfaces 16. In a top view from the side, the bearing shells 15 have a cloverleaf-shaped recess which forms the inner side.

In addition, the bearing shells 15 each have an elevation 18 on an end side 150 in both regions of the flat surfaces 16, said elevation extending radially from the inner side in the direction of the longitudinal axis 100. Said elevations 18 on the inner side of the bearing shell form a contact for the bearing 11 in the direction of the longitudinal axis 100. In the installed state, the bearing 11 is clamped between the lateral elevations 18 and is thus fixed in the interior of the bearing shells axially level with the pivot axis 110. Axial forces acting on the bearing 11 are absorbed by the clamping. The lateral elevations 18 are dimensioned in such a manner that they permit pivoting of the worm shaft. They therefore lie only against the outer ring 13 of the bearing 11, and the inner ring 12 is free. In the circumferential direction, the elevations 18 can extend over an angular range which is greater than the flat surfaces.

In order to ensure the orientation of the bearing arrangement 8 or of the bearing shells 15 in the transmission housing 7, the outer side of each bearing shell 15 has a projection 19. The projection 19 preferably lies in the circumferential direction in the region of one of the flat surfaces 16 located on the inner side. The transmission housing 7 has a seat for the bearing arrangement 8 with a corresponding recess for the projections 19 of the bearing shells. It is thus ensured that the bearing shells or the drive-side bearing arrangement 8 can be installed only with the correct orientation in the transmission housing 7.

The geometry of the bearing shells and of the outer ring of the rolling bearing define a pivot bearing which can tilt about the pivot axis with a small torque, as a result of which zero backlash is ensured over the service life. The pivoting movement of the worm shaft here is approximately 0.5°.

What is claimed is:

1. A helical gear transmission for an electromechanical servo steering mechanism, the helical gear transmission comprising:
a shaft that meshes with a helical gear, wherein the shaft is disposed in a transmission housing, wherein a first end of the shaft is mounted in a first bearing arrangement so as to be rotatable about an axis of rotation, wherein a second end of the shaft is mounted in a second bearing arrangement in the transmission housing, wherein the first bearing arrangement includes a rolling bearing, an outer ring of which is spherical, wherein the rolling bearing is enclosed by two bearing shells, wherein an outer side of the outer ring of the rolling bearing has two flat points that lie opposite each other in a circumferential direction and form a pivot axis about which the shaft is pivotable in a direction of the helical gear.

2. The helical gear transmission of claim 1 wherein an inner side of the two bearing shells has two flat surfaces that lie opposite each other in the circumferential direction and are in contact with the two flat points of the outer ring.

3. The helical gear transmission of claim 2 wherein the outer ring of the rolling bearing is in contact with the inner side of the two bearing shells at two further limited contact surfaces.

4. The helical gear transmission of claim 3 wherein the two further limited contact surfaces are shaped in a diametrically opposed manner to the spherical outer side of the outer ring.

5. The helical gear transmission of claim 3 wherein the two further limited contact surfaces are offset by 90° in the circumferential direction with respect to the two flat surfaces.

6. The helical gear transmission of claim 1 wherein the outer ring of the rolling bearing is in contact with an inner side of one of the two bearing shells at exactly four locations.

7. The helical gear transmission of claim 1 wherein the two bearing shells have lateral elevations that define a position of the rolling bearing in a direction of the axis of rotation.

8. The helical gear transmission of claim 7 wherein the lateral elevations are disposed along a circumference at least partially in regions of the two flat surfaces.

9. The helical gear transmission of claim 7 wherein the lateral elevations extend over an angular range of 45° to 135° and, opposite thereto, in an angular range of 225° to 315°.

10. The helical gear transmission of claim 7 wherein the lateral elevations are disposed on end sides of the two bearing shells, wherein inner sides of the lateral elevations are in contact with end sides of the outer ring of the rolling bearing.

11. The helical gear transmission of claim 1 wherein the two bearing shells are identical.

12. The helical gear transmission of claim 1 wherein an outer side of the two bearing shells has projections configured for securing against rotation, wherein the projections are configured to engage in recesses of the transmission housing.

13. The helical gear transmission of claim 1 wherein the second bearing arrangement includes a prestressing device by way of which a position of the shaft is adjustable with respect to the helical gear.

14. The helical gear transmission of claim 1 wherein the helical gear is a worm gear and the shaft is a worm shaft.

15. An electromechanical servo steering mechanism comprising:
    an electric motor with a motor shaft; and
    the helical gear transmission recited in claim 1, wherein the motor shaft drives the shaft of the helical gear transmission.

16. The electromechanical servo steering mechanism of claim 15 wherein the helical gear is configured to conjoint rotation on a steering shaft of a motor vehicle.

* * * * *